(12) United States Patent
Federspiel et al.

(10) Patent No.: US 7,348,519 B2
(45) Date of Patent: Mar. 25, 2008

(54) MULTI-ZONE GRIDDLE AND GRILL

(75) Inventors: William Federspiel, Fort Wayne, IN (US); Timothy Tippmann, Fort Wayne, IN (US)

(73) Assignee: Thermodyne Foodservice Products, Inc., Fort Wayne, IN (US)

( * ) Notice: Subject to any disclaimer, the term of this patent is extended or adjusted under 35 U.S.C. 154(b) by 134 days.

(21) Appl. No.: 11/324,251

(22) Filed: Jan. 4, 2006

(65) Prior Publication Data
US 2006/0150826 A1 Jul. 13, 2006

Related U.S. Application Data

(60) Provisional application No. 60/641,074, filed on Jan. 4, 2005.

(51) Int. Cl.
*F27D 11/00* (2006.01)
*A47J 37/10* (2006.01)

(52) U.S. Cl. ............... 219/385; 219/394; 219/407; 219/212; 219/552; 219/444.1; 219/398; 219/386; 99/422; 99/331; 99/448; 99/339; 99/335; 99/330; 99/450; 99/445; 126/25 R; 126/9 R; 126/337 R; 126/41 R

(58) Field of Classification Search ............ 219/385–7, 219/394–5, 398, 407, 409, 212, 552–553; 99/422, 331, 335, 330, 444.1, 448–9, 450, 99/445, 339; 126/25 R, 9 R, 337 R, 41 R
See application file for complete search history.

(56) References Cited

U.S. PATENT DOCUMENTS

5,227,597 A * 7/1993 Dickens et al. ............. 219/621
6,145,431 A * 11/2000 Tippmann et al. ............ 99/330

* cited by examiner

*Primary Examiner*—Shawntina Fuqua
(74) *Attorney, Agent, or Firm*—Birch, Stewart, Kolasch & Birch, LLP

(57) ABSTRACT

A multi-zone griddle with an upper substantially continuous layer of metal adapted for cooking a food product thereon. The upper substantially continuous layer of metal is positioned adjacent to a first lower layer of metal and is displaced a predetermined distance relative to the upper substantially continuous layer of metal to form a space therebetween. A second lower layer of metal is displaced a predetermined distance relative to the upper substantially continuous layer of metal to form a space therebetween. At least one serpentine passageway is formed in the space between the first lower layer of metal and the upper substantially continuous layer of metal. The at least one serpentine passageway may be connected to a source of heated fluid for providing heat to a portion of the upper substantially continuous layer of metal that corresponds to the position adjacent to the at least one serpentine passageway.

12 Claims, 3 Drawing Sheets

MULTI-ZONE GRIDDLE AND GRILL

CROSS-REFERENCE TO RELATED APPLICATIONS

The present application claims priority to U.S. Provisional Patent Application No. 60/641,074 filed on Jan. 4, 2005 the entire contents of which are hereby incorporated by reference.

BACKGROUND OF THE INVENTION

1. Field of the Invention

The present invention is directed to a multi-zone griddle and grill wherein a first portion of an upper layer of the griddle is maintained at a first predetermined temperature and a second portion of the upper layer of the griddle is maintained at a second predetermined temperature.

2. Description of Background Art

An upper surface of a griddle is normally maintained at a uniform predetermined temperature over the entire surface for cooking a food product thereon. If more than one burner is positioned under the griddle, an individual may adjust the heat applied to portions of the griddle. However, in view of the configuration of the upper surface of the griddle relative to the burners, it is difficult to maintain a uniform temperature supplied to the two portions of the griddle. What occurs is that heat from one portion of the griddle is transferred to other portions of the griddle. It is difficult to segregation the heat to two separate portions of the griddle.

SUMMARY AND OBJECTS OF THE INVENTION

It is an object of the present invention to provide a multi-zone griddle and grill wherein a first portion of an upper layer of the griddle is maintained at a first predetermined temperature and a second portion of the upper layer of the griddle is maintained at a second predetermined temperature.

These and other objects of the present invention are achieved by providing a multi-zone griddle includes an upper substantially continuous layer of metal adapted for cooking a food product thereon. The upper substantially continuous layer of metal has a front edge, a rear edge, a left side edge and a right side edge. A first lower layer of metal has a front edge, a rear edge and a left side edge that are substantially aligned with the front edge, rear edge and left side edge of the upper substantially continuous layer of metal. The first lower layer is displaced a predetermined distance relative to the upper substantially continuous layer of metal to form a space therebetween. A second lower layer of metal has a front edge, a rear edge and a right side edge that are substantially aligned with the front edge, rear edge and right side edge of the upper substantially continuous layer of metal, the second lower layer is displaced a predetermined distance relative to the upper substantially continuous layer of metal to form a space therebetween. At least one serpentine passageway is formed in the space between the first lower layer of metal and the upper substantially continuous layer of metal, the at least one serpentine passageway is adapted to be connected to a source of heated fluid for providing heat to a portion of the upper substantially continuous layer of metal that corresponds to the position adjacent to the at least one serpentine passageway. Wherein supplying a heated fluid to the at least one serpentine passageway permits the portion of the upper substantially continuous layer of metal that corresponds to the at least one serpentine passageway to be held at a first predetermined temperature, whereas a portion of the upper substantially continuous layer of metal that is displace laterally relative to the portion corresponding to the at least one serpentine passageway is maintained at a second predetermined temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
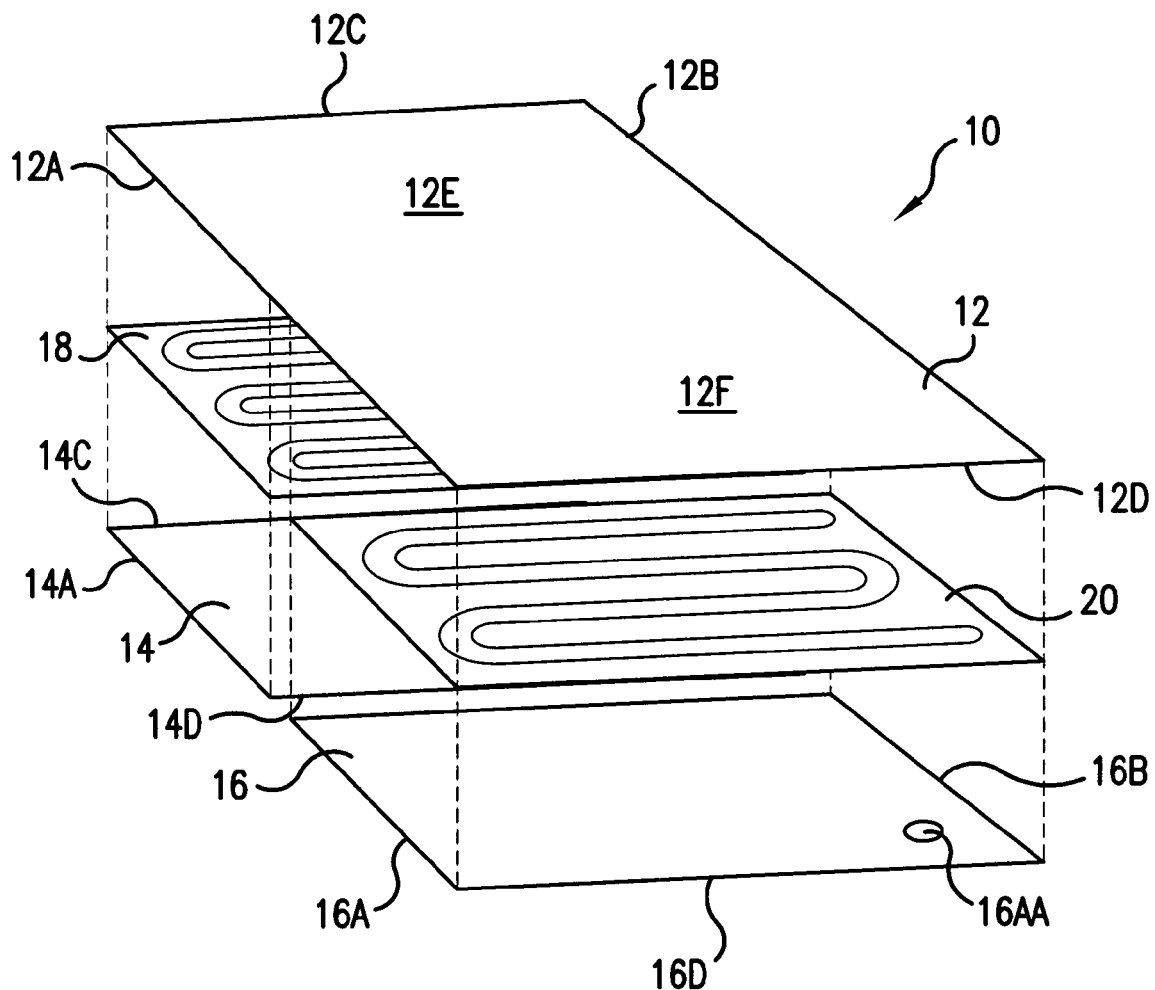
FIG. 1 is a perspective view of a multi-zone griddle and grill having a first portion of an upper layer of the griddle that is maintained at a first predetermined temperature and a second portion of the upper layer of the griddle that is maintained at a second predetermined temperature.

As illustrated in FIG. 1, a multi-zone griddle 10 includes an upper substantially continuous layer of metal 12 adapted for cooking a food product thereon. The upper substantially continuous layer of metal 12 has a front edge 12A, a rear edge 12B, a left side edge 12C and a right side edge 12D. A first lower layer of metal 14 has a front edge 14A, a rear edge and a left side edge 14C that are substantially aligned with the front edge 12A, rear edge 12B and left side edge 12C of the upper substantially continuous layer of metal 12. The first lower layer 14 is displaced a predetermined distance relative to the upper substantially continuous layer of metal 12 to form a space therebetween. A second lower layer of metal 16 has a front edge 16A, a rear edge 16B and a right side edge 16D that are substantially aligned with the front edge 12A, rear edge 12B and right side edge 12D of the upper substantially continuous layer of metal 12. The second lower layer 16 is displaced a predetermined distance relative to the upper substantially continuous layer of metal 12 to form a space therebetween. At least one serpentine passageway 18 is formed in the space between the first lower layer of metal 14 and the upper substantially continuous layer of metal 12. The at least one serpentine passageway 18 is adapted to be connected to a source of heated fluid for providing heat to a portion 12E of the upper substantially continuous layer of metal 12 that corresponds to the position adjacent to the at least one serpentine passageway 18. By supplying a heated fluid to the at least one serpentine passageway 18 permits the portion 12E of the upper substantially continuous layer of metal 12 that corresponds to the at least one serpentine passageway 18 to be held at a first predetermined temperature, whereas a portion 12F of the upper substantially continuous layer of metal 12 that is displace laterally relative to the portion 12E corresponding to the at least one serpentine passageway 18 is maintained at a second predetermined temperature.

As illustrated in FIG. 1, a second serpentine passageway 20 is formed in the space between the second lower layer of metal 16 and the upper substantially continuous layer of metal 12. The second serpentine passageway 20 is adapted to be connected to a source of heated fluid for providing heat to a portion 12F of the upper substantially continuous layer of metal 12 that corresponds to the position adjacent to the second serpentine passageway 20. By supplying a heated fluid that is at a second temperature to the second serpentine passageway 20 permits the portion 12F of the upper substantially continuous layer of metal 12 that corresponds to the second serpentine passageway 20 to be held at a second predetermined temperature, whereas a portion 12E of the upper substantially continuous layer of metal 12 that is displace laterally relative to the portion 12F corresponding to the at least one serpentine passageway 18 is maintained at a first predetermined temperature.

As illustrated in FIG. 1, an opening 16AA is provided in the second lower layer of metal 16 for permitting a connection with a source of heated fluid which will be circulated within the second serpentine passageway 20 for supplying heat to the portion 12F of the upper substantially continuous layer of metal 12.

If a two temperature griddle is maintained, the first side may be used for cooking a food product whereas the second side may be used for holding a food product after it is cooked.

In addition, as illustrated in FIG. 1, the first serpentine passageway 18 and the second serpentine passageway 20 are formed as two pieces to make a thermal break between the first serpentine passageway 18 and the second serpentine passageway 20. Further, the first lower layer of metal 14 and the second lower layer of metal 16 are formed as two pieces to make a thermal break between the first lower layer of metal 14 and the second lower layer of metal 16.

The upper substantially continuous layer of metal 12, the first serpentine passageway 18 and the second serpentine passageway 20 and the first lower layer of metal 14 and the second lower layer of metal 16 are copper brazed together to form the multi-zone griddle 10.

Figure 2:
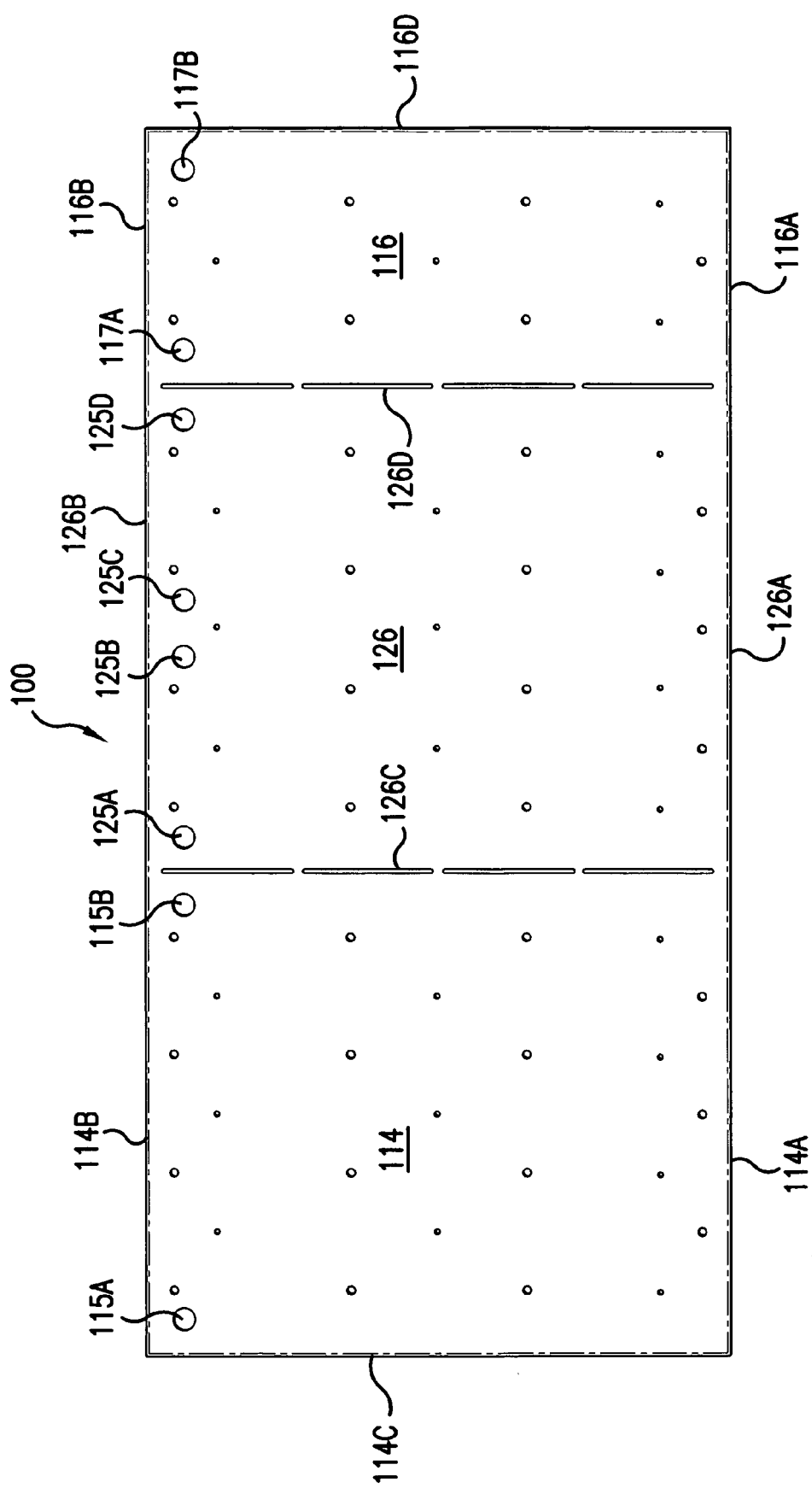
FIG. 2 is a top plan view of a second embodiment wherein a bottom plate is divided into three zones.
Figure 3:
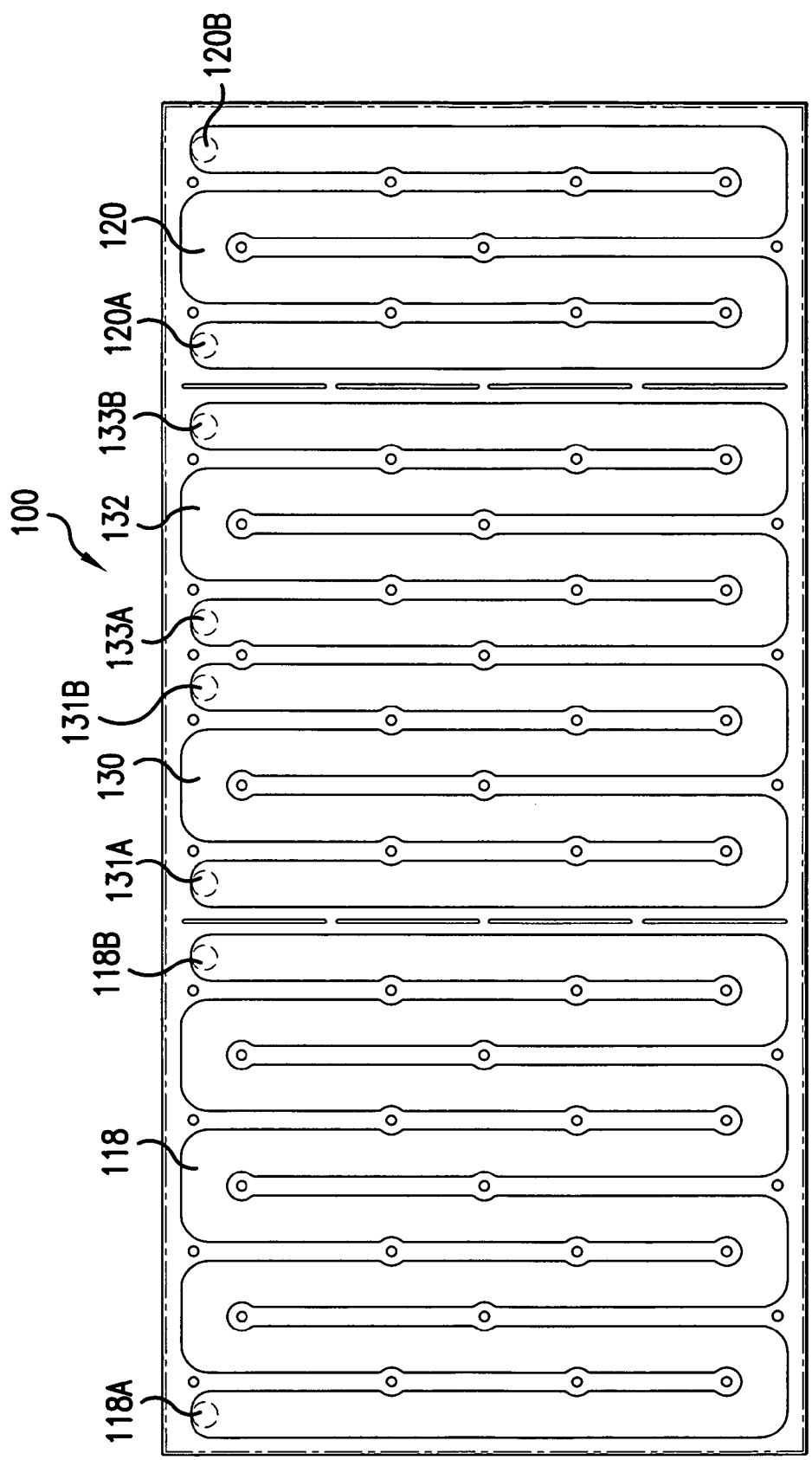
FIG. 3 is a top plan view of three serpentine passageways that forms three zones for aligning with the three zones of the bottom plate.

As illustrated in FIGS. 2 and 3, a multi-zone griddle 100 includes an upper substantially continuous layer of metal, not illustrated, adapted for cooking a food product thereon. The upper substantially continuous layer of metal has a front edge, a rear edge, a left side edge and a right side edge. A first lower layer of metal 114 has a front edge 114A, a rear edge 114B and a left side edge 114C that are substantially aligned with the front edge, rear edge and left side edge of the upper substantially continuous layer of metal. The first lower layer 114 is displaced a predetermined distance relative to the upper substantially continuous layer of metal to form a space therebetween.

A middle lower layer of metal 126 has a front edge 126A, a rear edge 126B, a left side edge 126C and a right side edge 126D. The front edge 126A and the rear edge 126B are substantially aligned with the front edge and rear edge of the upper substantially continuous layer of metal. The middle lower layer 126 is displaced a predetermined distance relative to the upper substantially continuous layer of metal to form a space therebetween.

A second lower layer of metal 116 has a front edge 116A, a rear edge 116B and a right side edge 116D that are substantially aligned with the front edge, rear edge and right side edge of the upper substantially continuous layer of metal. The second lower layer 116 is displaced a predetermined distance relative to the upper substantially continuous layer of metal to form a space therebetween.

A first serpentine passageway 118 is formed in the space between the first lower layer of metal 114 and the upper substantially continuous layer of metal. The first serpentine passageway 118 is adapted to be connected to a source of heated fluid for providing heat to a left portion of the upper substantially continuous layer of metal that corresponds to the position adjacent to the first passageway 118. By supplying a heated fluid to the first serpentine passageway 118 permits the left portion of the upper substantially continuous layer of metal that corresponds to the first serpentine passageway 118 to be held at a first predetermined temperature, whereas a middle portion and a right portion of the upper substantially continuous layer of metal that are displace laterally relative to the left portion corresponding to the first serpentine passageway 118 to be maintained at a middle predetermined temperature and a second predetermined temperature.

As illustrated in FIG. 3, a middle serpentine passageway 130, 132 is formed in the space between the middle lower layer of metal 126 and the upper substantially continuous layer of metal. The middle serpentine passageway 130, 132 is adapted to be connected to a source of heated fluid for providing heat to a middle portion of the upper substantially continuous layer of metal that corresponds to the position adjacent to the middle serpentine passageway 130, 132. By supplying a heated fluid that is at a middle temperature to the middle serpentine passageway 130, 132 permits the middle portion of the upper substantially continuous layer of metal that corresponds to the middle serpentine passageway 130, 132 to be held at a middle predetermined temperature, whereas a left portion of the upper substantially continuous layer of metal and a right portion are maintained at different predetermined temperatures.

As illustrated in FIG. 3, a second serpentine passageway 120 is formed in the space between the second lower layer of metal 116 and the upper substantially continuous layer of metal. The second serpentine passageway 120 is adapted to be connected to a source of heated fluid for providing heat to a right portion of the upper substantially continuous layer of metal that corresponds to the position adjacent to the second serpentine passageway 120. By supplying a heated fluid that is at a second temperature to the second serpentine passageway 120 permits the right portion of the upper substantially continuous layer of metal that corresponds to the second serpentine passageway 120 to be held at a second predetermined temperature, whereas a left portion of the upper substantially continuous layer of metal that is displace laterally relative to the right portion corresponding to the first serpentine passageway 118 to be maintained at a first predetermined temperature.

As illustrated in FIG. 3, the first serpentine passage 118 includes an entrance opening 118A and an exit opening 118B. The entrance opening 118A and an exit opening 118B align with an entrance opening 115A and an exit opening 115B in the first lower layer of metal 114. Heated fluid, in a preferred embodiment water, is pumped by using a first pump through the first serpentine passage 118 to maintain the upper substantially continuous layer of metal at a first predetermined temperature.

As illustrated in FIG. 3, the second serpentine passage 120 includes an entrance opening 120A and an exit opening 120B. The entrance opening 120A and an exit opening 120B align with an entrance opening 117A and an exit opening 117B in the second lower layer of metal 116. Heated fluid, in a preferred embodiment water, is pumped by using a second pump through the second serpentine passage 120 to maintain the upper substantially continuous layer of metal at a second predetermined temperature.

The middle serpentine passage 130 includes an entrance opening 131A and an exit opening 131B. The entrance opening 131 and an exit opening 131 align with an entrance opening 125A and an exit opening 125B in the middle lower layer of metal 126. Heated fluid, in a preferred embodiment water, is pumped by using a third pump through the middle serpentine passage 130 to maintain the upper substantially continuous layer of metal at a predetermined temperature.

The middle section may include a second middle serpentine passage 132 that includes an entrance opening 133A and an exit opening 133B. The entrance opening 133A and an exit opening 133B align with an entrance opening 125C and an exit opening 125D in the middle lower layer of metal 126. Heated fluid, in a preferred embodiment water, is pumped by using a fourth pump through the second middle serpentine passage 132 to maintain the upper substantially continuous layer of metal at a predetermined temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-zone griddle comprising:
   an upper continuous layer of metal adapted for cooking a food product thereon, said upper continuous layer of metal having a front edge, a rear edge, a left side edge and a right side edge and being of a predetermined length;
   a first lower layer of metal having a front edge, a rear edge and a left side edge that are substantially aligned with the front edge, rear edge and left side edge of the upper continuous layer of metal, said first lower layer being of a predetermined length that is less than the predetermined length of said upper continuous layer of metal and being displaced a predetermined distance relative to said upper continuous layer of metal to form a space therebetween;
   a second lower layer of metal having a front edge, a rear edge and a right side edge that are substantially aligned with the front edge, rear edge and right side edge of the upper continuous layer of metal, said second lower layer being of a predetermined length that is less than the predetermined length of said upper continuous layer of metal and being displaced a predetermined distance relative to said upper continuous layer of metal to form a space therebetween;
   the predetermined length of said first lower layer and the predetermined length of said second lower layer being substantially equal to the predetermined length of the upper continuous layer of metal with a space being formed between the first lower layer and the second lower layer; and
   at least one serpentine passageway being formed in the space between the first lower layer of metal and the upper continuous layer of metal, said at least one serpentine passageway being adapted to be connected to a source of heated fluid for providing heat to a portion of said upper continuous layer of metal that corresponds to the position adjacent to the at least one serpentine passageway;
   wherein supplying a heated fluid to said at least one serpentine passageway permits said portion of said upper continuous layer of metal that corresponds to said at least one serpentine passageway to be held at a first predetermined temperature, whereas a portion of said upper continuous layer of metal that is displace laterally relative to the portion corresponding to said at least one serpentine passageway is maintained at a second predetermined temperature.

2. The multi-zone griddle according to claim 1, wherein a second serpentine passageway is formed in the space between the second lower layer of metal and the upper continuous layer of metal, a heated fluid supplied to the second serpentine passageway permits the portion of the upper continuous layer of metal that corresponds to the second serpentine passageway to be maintained at the second predetermined temperature.

3. The multi-zone griddle according to claim 1, and further including a first pump for supplying heated fluid to said at least one serpentine passageway for heating the portion of the upper continuous layer of metal at the first predetermined temperature.

4. The multi-zone griddle according to claim 1, and further including a second pump for supplying heated fluid to said second serpentine passageway for heating the portion of the upper continuous layer of metal at the second predetermined temperature.

5. The multi-zone griddle according to claim 1, and further including a middle portion with a middle serpentine passageway being formed in the space between a middle lower layer of metal and the upper continuous layer of metal, a heated fluid supplied to the middle serpentine passageway permits the middle portion of the upper continuous layer of metal that corresponds to the middle serpentine passageway to be maintained at a third predetermined temperature.

6. A multi-zone griddle comprising:
   an upper continuous layer having a predetermined length;
   a first lower layer having a predetermined length that is less than the predetermined length of the upper continuous layer and a second lower layer having a predetermined length that is less than the predetermined length of the upper continuous layer, said first lower layer and said second lower layer being spaced a predetermined distance relative to the upper continuous layer;
   the predetermined length of said first lower layer and the predetermined length of the second lower layer being substantially equal to the predetermined length of the upper continuous layer of metal with a space being formed between the first lower layer and the second lower layer; and
   a first serpentine passageway and a second serpentine passageway disposed between the upper continuous layer and the first lower layer and the second lower layer;
   wherein said first serpentine passageway and said second serpentine passageway are formed as two pieces to make a thermal break between the first serpentine passageway and the second serpentine passageway and the first lower layer and the second lower layer are formed as two pieces to make a thermal break between the first lower layer and the second lower layer and wherein supplying a heated fluid of a first predetermined temperature to said first serpentine passageway and supplying a heated fluid of a second predetermined temperature to said second serpentine passageway permits a first portion of the upper continuous layer to be maintained at a first temperature and a second portion of said upper continuous layer to be maintained at a second temperature.

7. The multi-zone griddle according to claim 6, and further including a first pump for supplying heated fluid to said first serpentine passageway for heating the portion of the upper continuous layer at the first predetermined temperature.

8. The multi-zone griddle according to claim 6, and further including a second pump for supplying heated fluid to said second serpentine passageway for heating the portion of the upper continuous layer at the second predetermined temperature.

9. A multi-zone griddle comprising:
an upper continuous layer having a predetermined length and width;
a lower layer having a predetermined length and width that is substantially equal to the predetermined length and width of the upper continuous layer, said lower layer being spaced a predetermined distance relative to the upper continuous layer;
said lower layer including a slit being formed along at least one of said predetermined length and width for forming a thermal break between a first side of the lower layer and a second side of the lower layer; and
at least one serpentine passageway disposed between the upper continuous layer and at least one of the first side and second side of the lower layer;
wherein said thermal break formed by the slit in the lower layer and said at least one serpentine passageway supplied with a heated fluid of a predetermined temperature permits a first portion of the upper continuous layer to be maintained at a first temperature and a second portion of said upper continuous layer to be maintained at a second temperature.

10. The multi-zone griddle according to claim 9, and further including a pump for supplying heated fluid to said at least one serpentine passageway for heating the first portion of the upper continuous layer at the first predetermined temperature.

11. The multi-zone griddle according to claim 9, and further including a second serpentine passageway disposed between the upper continuous layer and the second side of the lower layer, and further including a second pump for supplying heated fluid to said second serpentine passageway for heating the second portion of the upper continuous layer at the second predetermined temperature.

12. The multi-zone griddle according to claim 9, wherein a plurality of slits are formed along said lower layer for forming the thermal break between the first side of the lower layer and the second side of the lower layer.

* * * * *